United States Patent
Kim et al.

(10) Patent No.: US 10,694,173 B2
(45) Date of Patent: Jun. 23, 2020

(54) MULTIVIEW IMAGE DISPLAY APPARATUS AND CONTROL METHOD THEREOF

(71) Applicant: SAMSUNG ELECTRONICS CO., LTD., Suwon-si (KR)

(72) Inventors: Sung-yeol Kim, Suwon-si (KR); Jin-mo Kang, Suwon-si (KR); Yong-seok Heo, Seoul (KR); Ho-young Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 501 days.

(21) Appl. No.: 14/807,058

(22) Filed: Jul. 23, 2015

(65) Prior Publication Data

US 2016/0044305 A1 Feb. 11, 2016

(30) Foreign Application Priority Data

Aug. 7, 2014 (KR) .................. 10-2014-0101884

(51) Int. Cl.
*H04N 13/398* (2018.01)
*H04N 13/122* (2018.01)
(Continued)

(52) U.S. Cl.
CPC ......... *H04N 13/398* (2018.05); *H04N 13/122* (2018.05); *H04N 13/128* (2018.05);
(Continued)

(58) Field of Classification Search
CPC ........... H04N 13/0497; H04N 13/0018; H04N 13/0022; H04N 13/0425; H04N 13/0427; H04N 2213/002
(Continued)

(56) References Cited

U.S. PATENT DOCUMENTS 8,339,333 B2   12/2012   Casner et al.
9,398,290 B2   7/2016    Hasegawa et al.
(Continued)

FOREIGN PATENT DOCUMENTS

CN   102710955 A   10/2012
CN   102928986 A   2/2013
(Continued)

OTHER PUBLICATIONS

Written Opinion, issued by International Searching Authority in corresponding International Application No. PCT/KR2015/008163, dated Dec. 9, 2015. (PCT/ISA/237).
(Continued)

*Primary Examiner* — William C Vaughn, Jr.
*Assistant Examiner* — Jae N Noh
(74) *Attorney, Agent, or Firm* — Sughrue Mion, PLLC

(57) ABSTRACT

A multiview image display apparatus is provided. The multiview image display apparatus includes a depth adjuster configured to adjust a depth of an input image, a renderer configured to perform rendering on multiview images based on the depth-adjusted image, a crosstalk compensator configured to perform crosstalk inverse compensation on the rendered multiview images, a display configured to arrange the crosstalk inverse compensated multiview images in a preset arrangement pattern and display the crosstalk inverse compensated multiview images arranged in the preset arrangement pattern, and a controller configured to estimate crosstalk, and control the depth adjuster to adjust a depth value of a region that satisfies a preset condition to a preset depth value based on the estimated crosstalk.

17 Claims, 17 Drawing Sheets

(51) Int. Cl.
  *H04N 13/327* (2018.01)
  *H04N 13/365* (2018.01)
  *H04N 13/351* (2018.01)
  *H04N 13/302* (2018.01)
  *H04N 13/128* (2018.01)

(52) U.S. Cl.
  CPC ......... *H04N 13/302* (2018.05); *H04N 13/327* (2018.05); *H04N 13/351* (2018.05); *H04N 13/365* (2018.05); *H04N 2213/002* (2013.01)

(58) Field of Classification Search
  USPC .......................................................... 348/43
  See application file for complete search history.

(56) References Cited

U.S. PATENT DOCUMENTS

| | | | |
|---|---|---|---|
| 9,509,970 B2* | 11/2016 | Dane ................. | H04N 13/0018 |
| 9,615,084 B2 | 4/2017 | Li et al. | |
| 2009/0167639 A1 | 7/2009 | Casner et al. | |
| 2009/0244266 A1 | 10/2009 | Brigham | |
| 2011/0090243 A1 | 4/2011 | Park et al. | |
| 2011/0298898 A1 | 12/2011 | Jung et al. | |
| 2012/0062709 A1 | 3/2012 | Kerofsky et al. | |
| 2012/0320097 A1 | 12/2012 | Ma et al. | |
| 2013/0321596 A1 | 12/2013 | Li et al. | |
| 2014/0022340 A1 | 1/2014 | Dane et al. | |
| 2014/0036046 A1 | 2/2014 | Hasegawa et al. | |
| 2014/0111627 A1* | 4/2014 | Ishigami ............ | H04N 13/0011 348/51 |
| 2014/0160174 A1 | 6/2014 | Tsuei et al. | |
| 2014/0225995 A1* | 8/2014 | Redmann ........... | H04N 13/0018 348/51 |
| 2014/0340491 A1* | 11/2014 | Cheng ................ | H04N 13/0402 348/51 |

FOREIGN PATENT DOCUMENTS

| | | |
|---|---|---|
| CN | 103595987 A | 2/2014 |
| CN | 103636200 A | 3/2014 |
| EP | 2710550 | 11/2012 |
| KR | 10-2010-0121608 A | 11/2010 |
| KR | 10-2011-0041753 A | 4/2011 |
| KR | 10-2011-0124473 A | 11/2011 |
| KR | 10-1332638 B1 | 11/2013 |
| KR | 10-2014-0077398 A | 6/2014 |
| WO | 2009/095862 A1 | 8/2009 |
| WO | 2012/156518 A2 | 11/2012 |
| WO | 2014029428 A1 | 2/2014 |

OTHER PUBLICATIONS

International Search Report, issued by International Searching Authority in corresponding International Application No. PCT/KR2015/008163, dated Dec. 9, 2015. (PCT/ISA/210).

Konrad, et al.; "Cancellation of Image Crosstalk in Time-Sequential Displays of Stereoscopic Video", IEEE Transactions on Image Processing, May 2000, vol. 9, Is. 5, 28 pages total.

Chang, et al.; "10.2: Crosstalk Suppression by Image Processing in 3D Display", Society for Information Display Symposium Digest of Technical Papers, May 2010, vol. 41, Is. 1, 4 pages total.

Communication dated Dec. 27, 2017 by the State Intellectual Property Office of P.R. China in counterpart Chinese Patent Application No. 201510484071.8.

Communication dated Feb. 22, 2018 by the European Patent Office in counterpart European Patent Application No. 15830508.6.

Communication dated Nov. 19, 2019 by the India Intellectual Property Office in counterpart Indian Patent Application No. 201717007600.

* cited by examiner

FIG. 3B

|       | View1 | View2 | View3 | View4 |
|-------|-------|-------|-------|-------|
| View1 | 1     | a%    | b%    | a%    |
| View2 | a%    | 1     | a%    | b%    |
| View3 | b%    | a%    | 1     | a%    |
| View4 | a%    | b%    | a%    | 1     |

[X]crosstalk martix

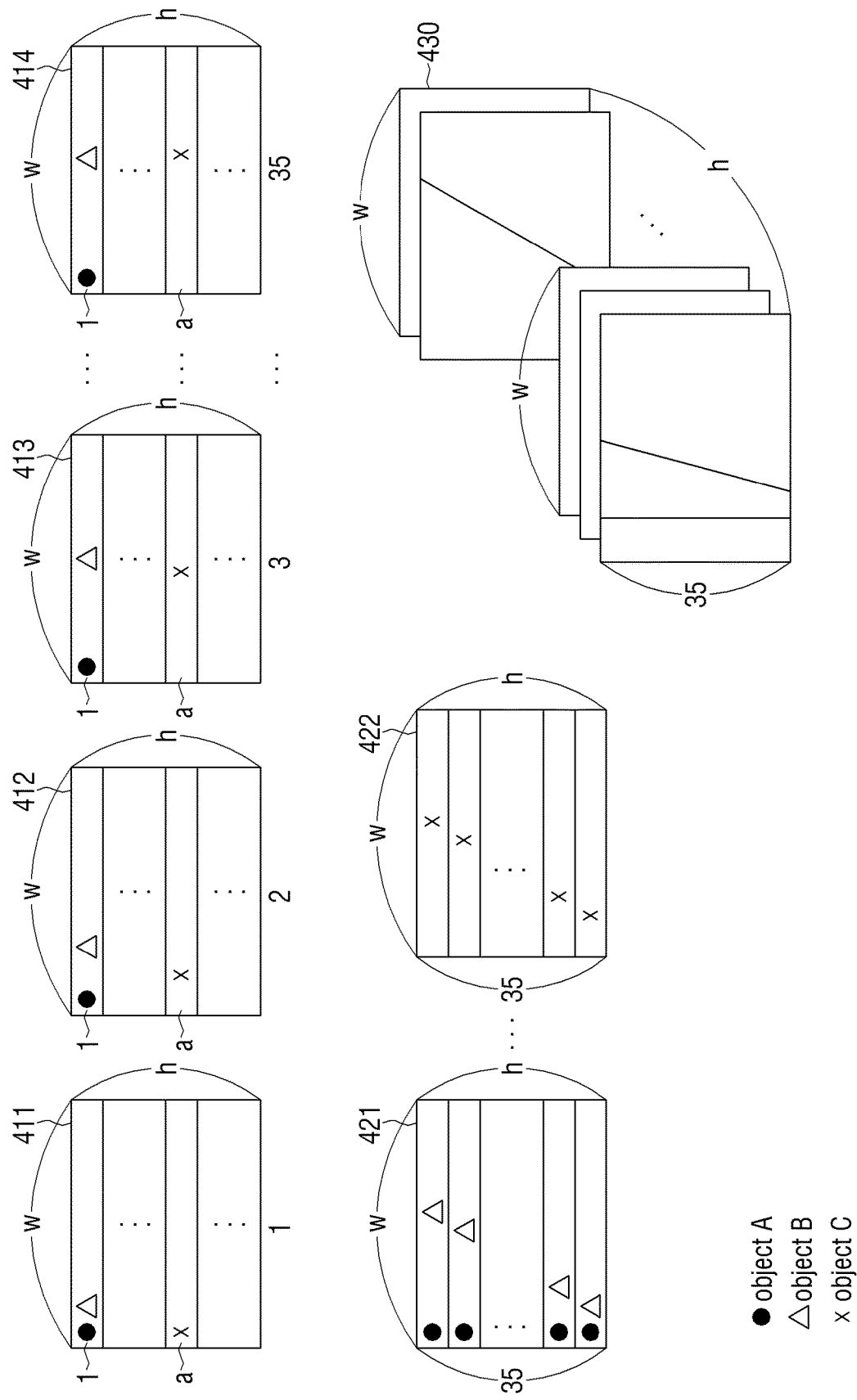

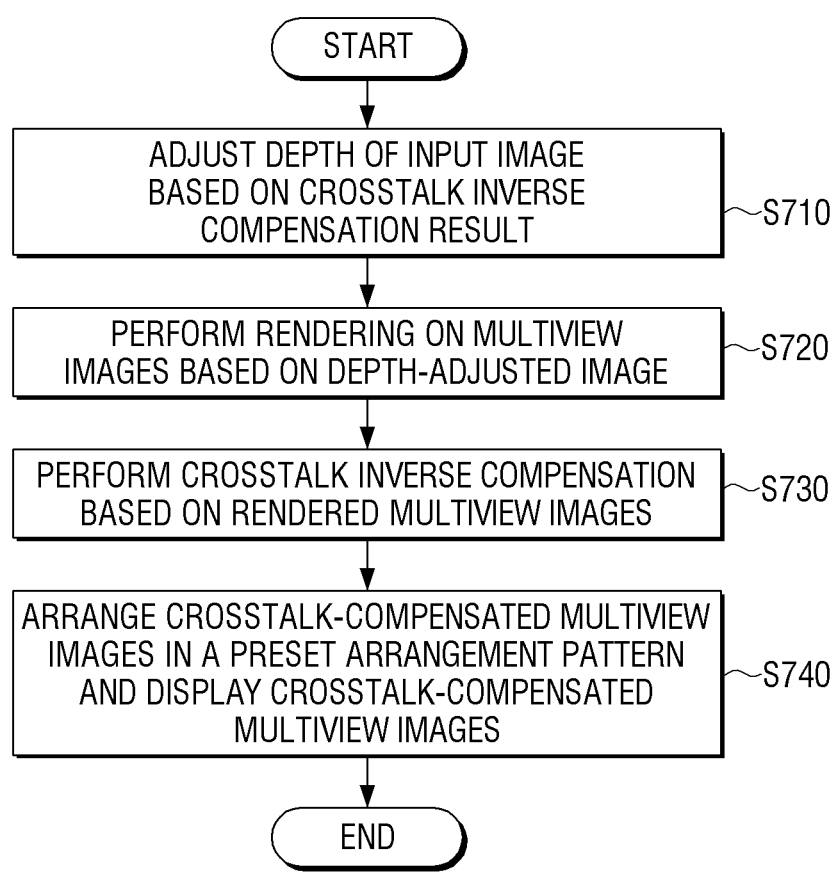

MULTIVIEW IMAGE DISPLAY APPARATUS AND CONTROL METHOD THEREOF

CROSS-REFERENCE TO RELATED APPLICATION

This application claims priority from Korean Patent Application No. 10-2014-0101884, filed on Aug. 7, 2014, in the Korean Intellectual Property Office, the disclosure of which is incorporated herein by reference in its entirety.

BACKGROUND

1. Field

Apparatuses and methods consistent with exemplary embodiments relate to a multiview image display apparatus and a control method thereof, and more particularly, to an autostereoscopic multiview image display apparatus and a control method thereof.

2. Description of the Related Art

With the development of electronic technology, various types of electronic apparatuses have been created and distributed. In particular, display apparatuses such as televisions (TVs) which are one of the most commonly used home appliances have been developed rapidly in recent years.

As the performance of the display apparatuses increases, the kind of content and the complexity of content displayed on the display apparatus has been variously increased. In particular, stereoscopic display systems capable of watching three-dimensional (3D) content have been developed and distributed in recent years.

The stereoscopic display apparatuses may be implemented by using various types of display apparatuses such as various monitors, a portable phone, a personal digital assistant (PDA), a personal computer (PC), a set-top PC, a tablet PC, an electronic photo frame, or kiosk, in addition to a 3D TV used in home. Further, 3D display technology may be used in home as well as in various fields necessary for 3D imaging such as science, medicine, design, education, advertising, or computer game.

The stereoscopic display systems may be typically divided into autostereoscopic systems capable of watching 3D images without glasses and stereoscopic systems capable of watching 3D images with wearing of glasses.

The stereoscopic system may provide a satisfactory 3D effect, but it is inconvenient for the viewer to have to wear glasses. In comparison, the autostereoscopic system may watch 3D images without glasses, and thus the development and availability of autostereoscopic system has steadily increased.

In particular, the image quality of a 3D image depends on contrast, flicker, crosstalk, or the like in an autostereoscopic system. The crosstalk is a phenomenon that a left-eye image is mixed with a right-eye image when viewed through the right eye or the right-eye image is mixed with the left-eye image when viewed through the left eye. The sharpness of the 3D image is degraded due to the crosstalk.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments relate to a multiview image display apparatus which provides a sharp 3D image through a combination of a crosstalk inverse compensation scheme and a depth adjustment scheme, and a control method thereof.

According to an aspect of an exemplary embodiment, there is provided a multiview image display apparatus. The multiview image display apparatus may include: a depth adjustment unit configured to adjust a depth of an input image; a rendering unit configured to render multiview images based on the depth-adjusted image; a crosstalk compensation unit configured to perform crosstalk inverse compensation based on the rendered multiview images; a display unit configured to arrange the multiview images on which the crosstalk inverse compensation is performed in a preset arrangement pattern, and display the multiview images arranged in the preset arrangement pattern; and a controller configured to estimate crosstalk, and control the depth adjustment unit to adjust a depth value of a region which satisfies a preset condition to a preset depth value based on a crosstalk estimation result.

The controller may control a depth value corresponding to a specific region of the input image to be adjusted to the preset depth value in response to a difference between a pixel value of the specific region of the input image and a pixel value of a neighboring region being equal to or larger than a preset threshold pixel value, and the depth value corresponding to the specific region being equal to or larger than a preset threshold depth value.

The controller may control to perform crosstalk inverse compensation according to the crosstalk estimation result in advance, and control a depth value of a region having a pixel value of less than a preset threshold value according to the crosstalk inverse compensation to the preset depth value.

The controller may control, in response to the depth value of the region having the pixel value of less than the preset threshold value being equal to or larger than the preset threshold depth value, the depth value of the region having the pixel value of less than the preset threshold value to be reduced, and may control, in response to the depth value of the region having the pixel value of less than the preset threshold value being less than the preset threshold depth value, the depth value of the region having the pixel value of less than the preset threshold value to be increased.

The crosstalk compensation unit may generate an epipolar image corresponding to each of pixel lines of the rendered multiview images by combining the pixel lines of the rendered multiview images, and perform crosstalk inverse compensation by applying a crosstalk inverse filter to the generated epipolar image.

The controller may control to compensate a pixel value of a region having the pixel value of less than the preset threshold value in the epipolar image according to the crosstalk inverse compensation with a pixel value of a neighboring region.

The controller may control to compensate the pixel value of the region having the pixel value of less than the preset threshold value in the epipolar image according to the crosstalk inverse compensation with a pixel value of a region of the input image corresponding to the region having the pixel value of less than the preset threshold value.

The controller may control to compensate the pixel value of the region having the pixel value of less than the preset threshold value in the epipolar image according to the crosstalk inverse compensation with a pixel value on which the crosstalk inverse compensation is performed in a previous image of the input image.

The region having the pixel value of less than the preset threshold value may be a region having a negative pixel value.

The display unit may include a display panel in which a plurality of images having different viewpoints are serially repeatedly arranged, and a viewing area separation unit disposed in front of the display panel and configured to provide optical views having different viewpoints. The crosstalk compensation unit may compensate crosstalk generated between the optical views having the different viewpoints.

According to an aspect of an exemplary embodiment, there is provided a control method of a multiview image display apparatus. The control method may include: adjusting a depth of an input image; performing rendering on multiview images based on the depth-adjusted image; performing crosstalk inverse compensation based on the rendered multiview images; and arranging the multiview images on which the crosstalk inverse compensation is performed in a preset arrangement pattern and displaying the multiview images arranged in the preset arrangement pattern. The adjusting of the depth may include estimating crosstalk, and adjusting a depth value of a region which satisfies a preset condition to a preset depth value based on a crosstalk estimation result.

The adjusting of the depth may include, in response to a difference between a pixel value of a specific region of the input image and a pixel value of a neighboring region being equal to or larger than a preset threshold pixel value, and a depth value corresponding to the specific region being equal to or larger than a preset threshold depth value, adjusting the depth value corresponding to the specific region to the preset depth value.

The control method may further include performing crosstalk inverse compensation according to the crosstalk estimation result in advance. The adjusting of the depth may include adjusting a depth value of a region having a pixel value of less than the preset threshold value according to the crosstalk inverse compensation to the preset depth value.

The adjusting of the depth may include, in response to the depth value of the region having the pixel value of less than the preset threshold value being equal to or larger than the preset threshold depth value, adjusting the depth value of the region having the pixel value of less than the preset threshold value to be reduced, and in response to the depth value of the region having the pixel value of less than the preset threshold value being less than the preset threshold depth value, adjusting the depth value of the region having the pixel value of less than the preset threshold value to be increased.

The performing of the crosstalk inverse compensation may include generating an epipolar image corresponding to each of pixel lines of the rendered multiview images by combining the pixel lines of the rendered multiview images, and performing crosstalk inverse compensation by applying a crosstalk inverse filter to the generated epipolar image.

The control method may further include compensating a pixel value of a region having the pixel value of less than the preset threshold value in the epipolar image according to the crosstalk inverse compensation with a pixel value of a neighboring region.

The control method may further include compensating the pixel value of the region having the pixel value of less than the preset threshold value in the epipolar image according to the crosstalk inverse compensation with a pixel value of a region of the input image corresponding to the region having the pixel value of less than the preset threshold value.

The control method may further include compensating the pixel value of the region having the pixel value of less than the preset threshold value in the epipolar image according to the crosstalk inverse compensation with a pixel value on which the crosstalk inverse compensation is performed in a previous image of the input image.

The region having the pixel value of less than the preset threshold value may be a region having a negative pixel value.

The multiview image display apparatus may include a display panel in which a plurality of images having different viewpoints are serially repeatedly arranged, and a viewing area separation unit disposed in front of the display panel and configured to provide optical views having different viewpoints. The performing of crosstalk inverse compensation may include compensating crosstalk generated between the optical views having the different viewpoints.

According to an aspect of an exemplary embodiment, a control method of a multiview image display apparatus is provided. The method includes adjusting a depth of an input image by estimating crosstalk, and adjusting a depth value of a region that satisfies a preset condition to a preset depth value based on the estimated crosstalk, rendering multiview images based on the depth-adjusted image, performing crosstalk inverse compensation on rendered multiview images, and arranging the crosstalk inverse compensated multiview images in a preset arrangement pattern and displaying the crosstalk inverse compensated multiview images arranged in the preset arrangement pattern.

The adjusting of the depth may include adjusting the depth value corresponding to the specific region to the preset depth value in response to a difference between a pixel value of a specific region of the input image and a pixel value of a neighboring region being equal to or larger than a preset threshold pixel value, and a depth value corresponding to the specific region being equal to or larger than a preset threshold depth value.

The method may further include performing crosstalk inverse compensation according to the estimated crosstalk. The adjusting of the depth may include adjusting a depth value of a region having a pixel value of less than the preset threshold value according to the crosstalk inverse compensation to the preset depth value.

The adjusting of the depth may include adjusting the depth value of the region having the pixel value of less than the preset threshold value to be reduced in response to the depth value of the region having the pixel value of less than the preset threshold value being equal to or larger than the preset threshold depth value, and adjusting the depth value of the region having the pixel value of less than the preset threshold value to be increased in response to the depth value of the region having the pixel value of less than the preset threshold value being less than the preset threshold depth value.

According to the above-described various exemplary embodiments, image quality of a 3D image provided from an autostereoscopic display system may be improved.

Additional aspects and advantages of the exemplary embodiments will be set forth in the detailed description, will be obvious from the detailed description, or may be learned by practicing the exemplary embodiments.

BRIEF DESCRIPTION OF THE DRAWINGS

The above and/or other aspects will be more apparent by describing in detail exemplary embodiments, with reference to the accompanying drawings, in which:

FIG. 3A to 3D are views explaining a method of performing crosstalk inverse compensation according to an exemplary embodiment;

FIGS. 4A to 4C are views explaining a crosstalk inverse compensation method according to an exemplary embodiment;

FIG. 7 is a flowchart illustrating a control method of a multiview image display apparatus according to an exemplary embodiment.

DETAILED DESCRIPTION OF THE EXEMPLARY EMBODIMENTS

Figure 1:
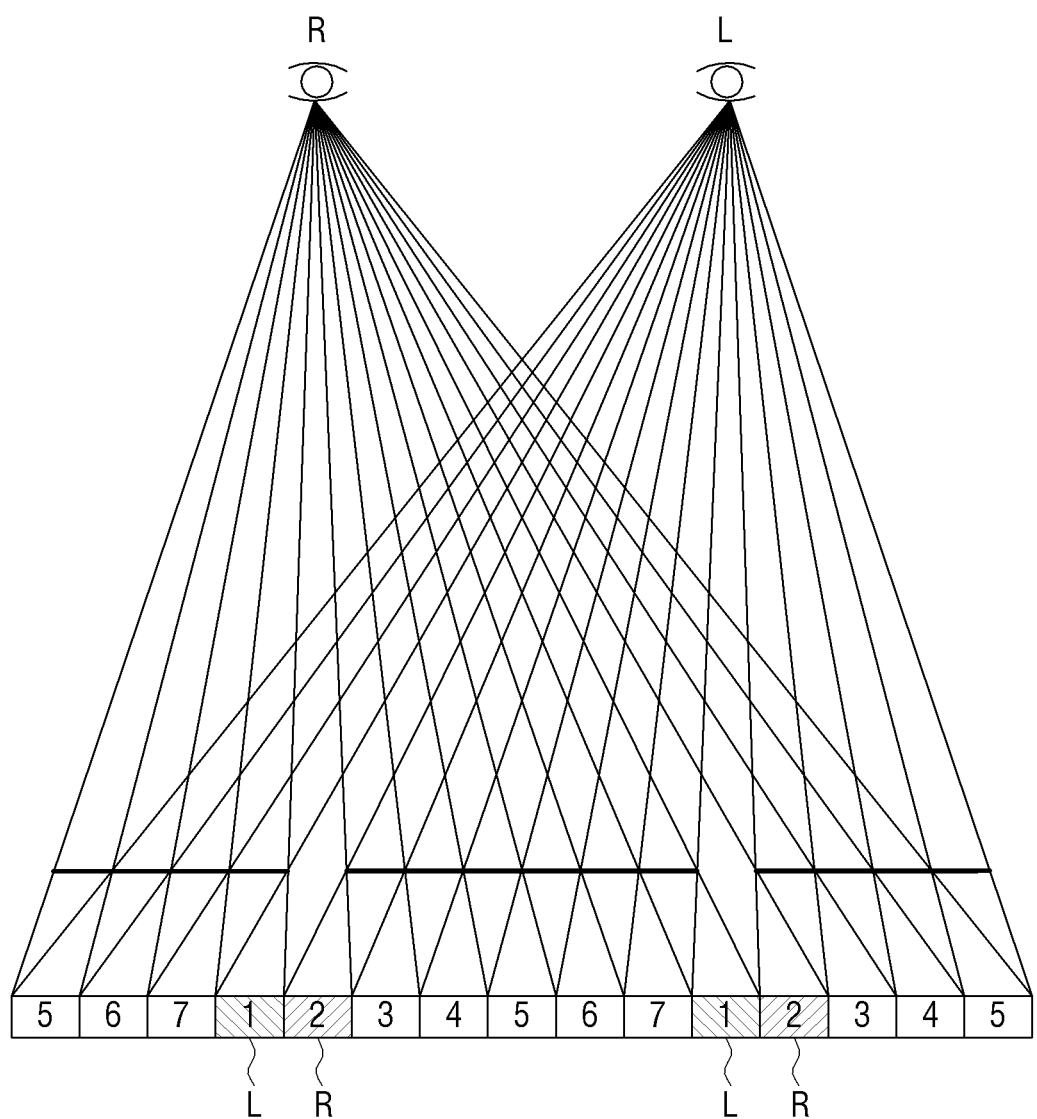
FIG. 1 is a view explaining an operation of a multiview image display apparatus.

Hereinafter, exemplary embodiments will be described in more detail with reference to the accompanying drawings.

In the following description, the same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Functions or elements known in the related art are not described in detail because they would obscure the exemplary embodiments with unnecessary detail.

FIG. 1 is a view explaining an operation of a multiview image display apparatus for understanding of the inventive concept.

FIG. 1 illustrates an operation method of an apparatus which displays a multiview image and provides a 3D image through an autostereoscopic method. The multiview image includes a plurality of images in which the same object is captured at different angles. That is, an image, in which the plurality of images captured in different viewpoints are refracted to different angles, and thus focused at a position distant by a certain distance (for example, about 3 m) called a viewing distance, is provided. The position in which the image is formed is called a viewing zone (or an optical view). Thus, one eye of a user is positioned in a first viewing zone, the other eye of the user is positioned in a second viewing zone, and thus the user feels a 3D effect.

As an example, FIG. 1 is a view explaining a display operation of a multiview image, for example, a multiview image having total 7 viewpoints. Referring to FIG. 1, in the autostereoscopic 3D display apparatus, light corresponding to the image of a first viewpoint among the 7 viewpoints may be projected to the left eye, and light corresponding to the image of a second viewpoint may be projected to the right eye. Thus, the user may watch the images having different viewpoints through the left eye and the right eye and thus the user may feel the 3D effect.

FIGS. 2A to 2D are views illustrating configurations and operations of multiview image display apparatuses according to various exemplary embodiments.

Figure 2A:
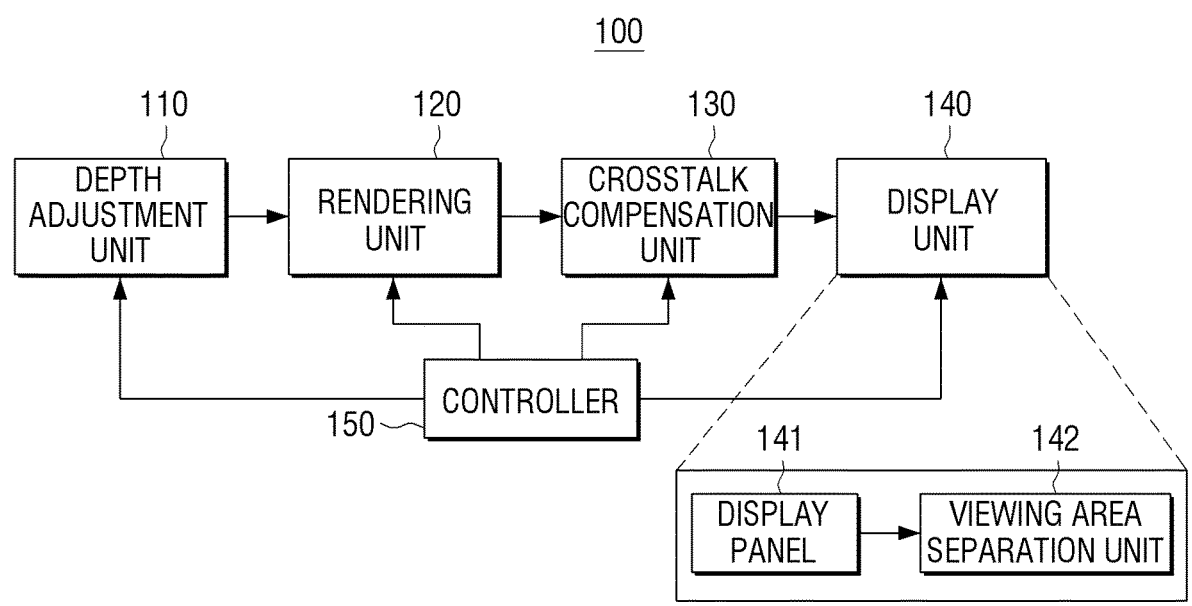
FIGS. 2A to 2D are views illustrating configurations and operations of multiview image display apparatuses according to various exemplary embodiments.

FIG. 2A is a block diagram illustrating a configuration of a multiview image display apparatus according to an exemplary embodiment.

Referring to FIG. 2A, a multiview image display apparatus 100 includes a depth adjustment unit 110 (e.g., a depth adjuster, etc.), a rendering unit 120 (e.g., a renderer, etc.), a crosstalk compensation unit 130 (e.g., a crosstalk compensator, etc.), a display unit 140 (e.g., a display, etc.), and a controller 150 (e.g., a processor, CPU, etc.).

The multiview image display apparatus 100 may be implemented with various types of display apparatuses such as a television (TV), a monitor, a personal computer (PC), a kiosk, a tablet PC, an electronic photo frame, or a portable phone.

An image input unit receives an image. Specifically, the image input unit may receive the image from various external apparatuses such as an external storage medium, a broadcasting station, or a web server. The input image is any one of a single-view image, a stereoscopic image, and a multiview image. The single-view image is an image captured through a general imaging apparatus, and the stereoscopic image is a 3D video image represented only with a left-eye image and a right-eye image, and a 3D image captured through a stereoscopic imaging apparatus. In general, the stereoscopic imaging apparatus is an imaging apparatus which includes two lenses and is used to image the 3D image. The multiview image means a 3D video image which provides various viewpoints of various directions to the user through geometric correction, spatial synthesis, and the like on images captured through one or more imaging apparatuses.

Further, the image input unit may receive depth information of an image. In general, the depth of the image is a depth value assigned to each pixel of the image, and for example, the 8-bit depth may have gray scale values of from 0 (zero) to 255. For example, on the basis of black/white, the black (a low gray scale value) represents a location far away from the viewer, and the white (a high gray scale value) represents a location close to the viewer.

The depth information is information indicating a depth of a 3D image, and the depth information is information corresponding to degree of binocular disparity between a left-eye image and a right-eye image constituting the 3D image. The degree of a 3D effect felt by the viewer is changed according to the depth information. In response to the depth being large, because the binocular disparity is increased, and the 3D effect experienced is relatively large. In response to the depth being small, because the binocular disparity is reduced, and the 3D effect experienced is relatively small. The depth information may be generally acquired through a passive method using only 2D characteristics of an image such as stereo matching and an active method using equipment such as a depth camera. The depth information may be provided in the form of a depth map.

The depth map may be a table including pieces of depth information according to regions of an image. The regions may be divided in pixel units, and may be defined as a preset region larger than the pixel unit. According to an exemplary embodiment, the depth map may have a form of representing a value smaller than 127 or 128 as a negative (−) value and a value larger than 127 or 128 as a positive (+) value using 127 or 128 among the gray scale values of from 0 to 255 as a reference value, that is, 0 (zero) (or focal plane). The reference value of the focal plane may be arbitrarily selected between 0 (zero) and 255. The negative (−) value means subduction and the positive (+) value means protrusion.

The depth adjustment unit 110 adjusts a depth of the input image based on the depth information. Specifically, the depth adjustment unit 110 may adjust the depth of the input image so that a depth value of a region which satisfies a preset condition is adjusted to a preset depth value based on a crosstalk estimation result, and detailed description of the depth adjustment will be made with description for the controller 150 to be described later.

The rendering unit 120 may perform rendering on a multiview image (e.g., render a multiview image, etc.) using the image of which the depth is adjusted in the depth adjustment unit 110.

Specifically, in response to the depth-adjusted image being a 2D image, the rendering unit 120 may perform rendering on the multiview image based on depth information extracted in 2D/3D conversion. Alternatively, in response to multi-optical views, that is, N views and N pieces of information corresponding to the N views being input, the rendering unit 120 may perform rendering on the multiview image based on at least one of the input N views and at least one of the N pieces of input depth information. Further, in response to only the N views being input, the rendering unit 120 may extract depth information from the N views and perform rendering on the multiview image based on the extracted depth information.

As an example, the rendering unit 120 may select one of a left-eye image and a right-eye image which constitute a 3D image as a reference view (or a center view) and generate a leftmost view and a rightmost view as a basis of the multiview image. The rendering unit 120 may generate the leftmost view and the rightmost view based on the corrected depth information corresponding to one of the left-eye image and the right-view image selected as the reference view. In response to the leftmost view and the rightmost view being generated, the rendering unit 120 may generate a plurality of interpolation views between the center view and the leftmost view, generate a plurality of interpolation views between the center view and the rightmost view, and perform rendering on the multiview image. However, this is not limited thereto, and an extrapolation view generated through an extrapolation method may be generated. In response to the rendering on the multiview image being performed based on a 2D image and depth information, the 2D image may be selected as the center view.

However, the detailed operation of the rendering unit 120 is merely exemplary, and the rendering unit 120 may perform rendering on the multiview image through various methods other than the above-described operation.

The crosstalk compensation unit 130 performs crosstalk inverse compensation based on the multiview image rendered in the rendering unit 120. That is, the crosstalk compensation unit 130 may perform crosstalk inverse compensation on crosstalk generated between optical views having different viewpoints.

Specifically, the crosstalk compensation unit 130 may perform crosstalk inverse compensation based on an epipolar image generated based on the rendered multiview image.

For example, the crosstalk compensation unit 130 may perform crosstalk inverse compensation by applying a crosstalk inverse filter on the basis of an image having one viewpoint from a pixel column of an epipolar image configured of the same pixel lines of a plurality of multiview images, for example, first pixel lines of the plurality of multiview images, and applying the crosstalk inverse filter to the remaining images having other viewpoints through the same method as described above. The crosstalk compensation unit 130 may perform crosstalk inverse compensation by applying the crosstalk inverse filter on epipolar images configured of the remaining pixel lines through the same method as described above. Detailed description thereof will be made with reference to the accompanying drawings.

The display unit 140 performs a function to provide multiple optical views. The display unit 140 may include a display panel 141 and a viewing area separation unit 142 (e.g., a viewing area separator, etc.) which are configured to provide the multiple optical views.

The display panel 141 includes a plurality of pixels of which each includes a plurality of sub pixels. The sub pixels may include red (R), green (G), and blue (B). That is, the pixels including the R, G, and B sub pixels are arranged in a plurality of rows and a plurality of columns to constitute the display panel 141. The display panel 141 may be implemented with various display units such as a liquid crystal display (LCD) panel, a plasma display panel (PDP), an organic light emitting diode (OLED), a vacuum fluorescent display (VFD), a field emission display (FED), or an electro luminescence display (ELD).

The display panel 141 displays an image frame. Specifically, the display panel 141 may display the image frame in which a plurality of images having different viewpoints are repeatedly arranged in a serial manner.

If the display panel 141 being implemented with a LCD panel, the display apparatus 100 may further include a backlight unit configured to supply backlight to the display panel 141 and a panel driver configured to drive the pixels of the display panel 141 according to pixel values of the pixels constituting the image frame.

The viewing area separation unit 142 may be disposed in front of the display panel 141, and provide different viewpoints according to a viewing area, that is, multiple optical views. The viewing area separation unit 142 may be implemented with a lenticular lens or a parallax barrier.

As an example, the viewing area separation unit 142 may be implemented with the lenticular lens including a plurality of lens areas. The lenticular lens may refract an image displayed in the display panel 141 through the plurality of lens areas. Each of the lens areas may be formed to have a size corresponding to at least one pixel, and may differently disperse light transmitting each pixel according to the viewing area.

As another example, the viewing area separation unit 142 may be implemented with the parallax barrier. The parallax barrier is implemented with a transparent slit array including a plurality of barrier areas. The parallax barrier may block light through a slit between barrier areas, and allow images having different viewpoints according to viewing areas to be emitted.

Figure 2B:
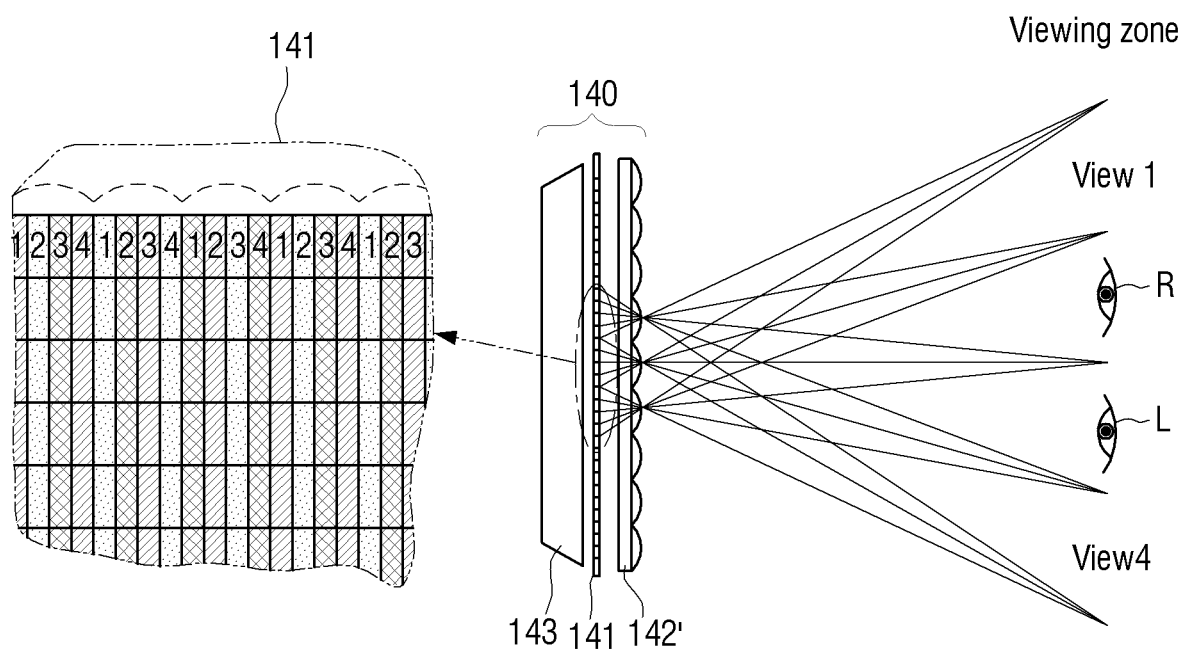

FIG. 2B illustrates an example in which the viewing area separation unit 142 is implemented with a lenticular lens array according to an exemplary embodiment.

Referring to FIG. 2B, the display unit 140 includes a display panel 141, a lenticular lens array 142', and a backlight unit 143 (e.g., a backlight, etc.).

Referring to FIG. 2B, the display panel 141 includes a plurality of pixels divided in a plurality of columns. Images having different viewpoints are arranged in the columns. FIG. 2B illustrates a pixel arrangement form that a plurality of images 1, 2, 3, and 4 having different viewpoints are serially repeatedly arranged. That is, the pixel columns are arranged with groups numbered by 1, 2, 3, and 4. A graphic signal applied to the display panel is arranged so that a first image is displayed in a pixel column 1 and a second image is displayed in a pixel column 2.

The backlight unit 143 provides light to the display panel 141. The images 1, 2, 3, and 4 formed in the display panel 141 are projected to the lenticular lens array 142' through the light provided from the backlight unit 143, and the lenticular lens array 142' disperses the lights of the projected images 1, 2, 3, and 4, and transfers the lights of the images 1, 2, 3, and 4 to a viewer direction. That is, the lenticular lens array 142' generates exits pupils in a position of a viewer, that is, a viewing distance and/or viewing angle of the user. In case the viewing area separation unit 142 is implemented as the lenticular lens array 142' as illustrated in FIG. 2B, a thickness and diameter of the lenticular lens array 142' may be designed so that the exit pupils generated by the columns are separated by an average binocular center distance of less than 65 mm. In case the viewing area separation unit 142 is implemented as the parallax barrier, a distance between slits in the parallax barrier may be designed so that the exit pupils generated by the columns are separated by the average binocular center distance of less than 65 mm. That is, as illustrated in FIG. 2B, in response to first to fourth views being formed, and the left eye and right eye of the user being located in the second view and the third view, the user may watch the 3D image.

The viewing area separation unit 142 may be tilted to a certain angle and operated so as to improve image quality. The controller 150 may divide the multiview images based on the tilt angle of the viewing area separation unit 142, combine the divided multiview images, and generate an image frame. Thus, the user may not watch images displayed in the sub pixels of the display panel 141 to a vertical direction or a horizontal direction but the user may watch images displayed in partial regions of the sub pixels oblique to a certain direction. Thus, the viewer may watch not the whole sub pixel but the partial region of the sub pixel. For example, in response to being assumed that total 6 viewpoints are provided, as illustrated in FIG. 2D, the rendering on an output image may be performed so that at least portions of the plurality of sub pixels output pixel values corresponding to the plurality of multiview images. At this time, in response to a first-viewpoint image being watched by the left-eye of the viewer, and a second-viewpoint image being watched by the right eye of the viewer, the viewer may watch an oblique region 10 corresponding to the first-viewpoint image through the right-eye and an oblique region 20 corresponding to the second-viewpoint image through the left eye. However, the rendering image of FIG. 2D is merely exemplary, and the number of multiview images, a rendering pitch, or the like may be variously changed according to the implemented example.

The controller 150 may control an overall operation of the display apparatus 100.

The controller 150 may estimate crosstalk, and control the depth adjustment unit 110 so that a depth value of a region which satisfies a preset condition is adjusted to a preset depth value based on the crosstalk estimation result. The controller may also control one or more of the depth adjustment unit 110, the rendering unit 120, the crosstalk compensation unit 130, and the display unit 140.

Specifically, in response to a difference between a pixel value of a specific region in the input image and a pixel value of a neighboring region being equal to or larger than a preset threshold pixel value, and a depth value corresponding to the corresponding specific region being equal to or larger than a preset threshold depth value, the controller 150 may control the depth value corresponding to the corresponding specific region to be adjusted to the preset depth value.

The controller 150 may perform crosstalk inverse compensation according to the crosstalk estimation result, and control a depth value of a region having a pixel value of less than a preset threshold value according to the crosstalk inverse compensation to be adjusted to the preset depth value. The region having the pixel value of less than the preset threshold value may be a region having a negative pixel value. For example, the region having the pixel value of less than the preset threshold value may be a region of which the pixel value is equal to or less than 0 and equal to or larger than 255 after the crosstalk inverse compensation.

Specifically, in response to the depth value of the region having the pixel value of less than the preset threshold value being equal to or greater than the preset threshold depth value, the controller may control the depth value to be reduced, and in response to the depth value of the region having the pixel value of less than the preset threshold value being smaller than the preset threshold depth value, the controller may control the depth value to be increased. The preset threshold depth value may be determined to a value which allows the crosstalk to be minimized, and may be determined to an appropriate value through experiments.

The controller 150 may compensate the pixel value of the region having the pixel value of less than the preset threshold value according to the crosstalk inverse compensation to a preset pixel value.

Specifically, in response to the crosstalk inverse compensation being performed based on an epipolar image generated based on the rendered multiview images, the controller 150 may compensate the pixel value of the region having the pixel value of less than the preset threshold value in the epipolar image according to the crosstalk inverse compensation to a pixel value of the neighboring region having a preset threshold value or more. That is, the pixel value of the region having a negative pixel value in the epipolar image according to the crosstalk inverse compensation may be compensated with a positive pixel value of the neighboring region.

Alternatively, in response to the crosstalk inverse compensation being performed based on the epipolar image generated based on the rendered multiview images, the controller 150 may compensate the pixel value of the region having the pixel value of less than the preset threshold value in the epipolar image according to the crosstalk inverse compensation with a pixel value of a region corresponding to the region having the pixel value of less than the preset threshold value in the input image. That is, the controller 150 may compensate the pixel value of the region having the negative pixel value in the epipolar image according to the crosstalk inverse compensation with a positive pixel value of the region corresponding to the region having the pixel value of less than the preset threshold value in the input image.

Further, in response to the crosstalk inverse compensation being performed based on the epipolar image generated based on the rendered multiview images, the controller 150 may compensate the pixel value of the region having the pixel vale of less than the preset threshold value in the epipolar image according to the crosstalk inverse compensation with a pixel value on which the crosstalk inverse compensation is performed in a previous image of the input image. That is, in the case where the region having the negative pixel value in the epipolar image corresponding to a current image frame according to the crosstalk inverse compensation has a positive pixel value in an epipolar image corresponding to a previous image frame according to the crosstalk inverse compensation, the controller 150 may compensate the pixel value of the region having the pixel value of less than the preset threshold value with a pixel value on which the crosstalk inverse compensation is performed in the previous image frame.

Figure 2C:
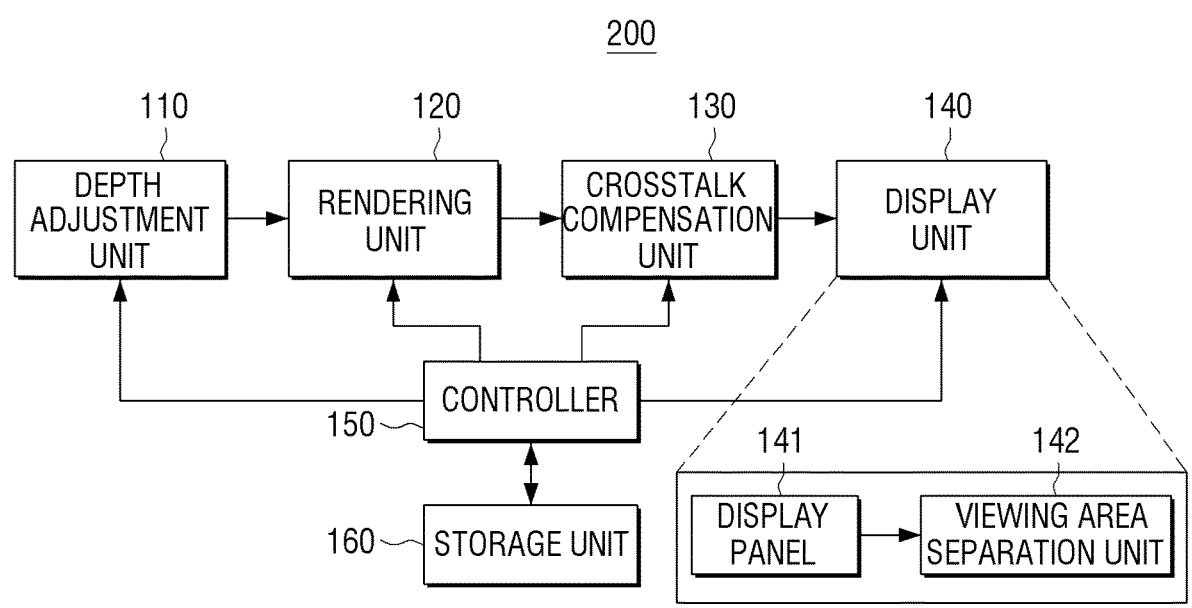
Figure 2D:
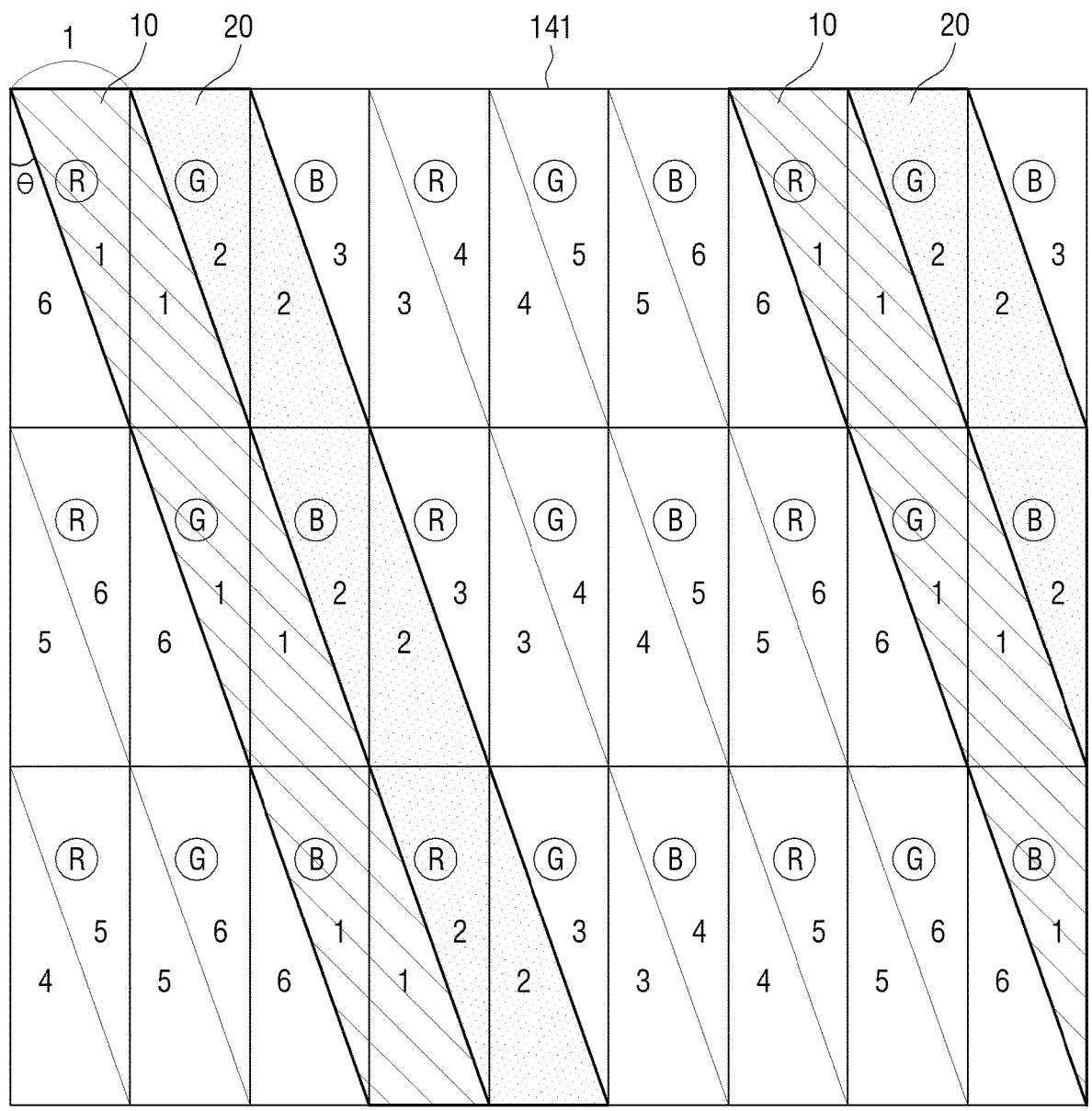

FIG. 2C is a block diagram illustrating a configuration of a multiview image display apparatus according to another exemplary embodiment.

Referring to FIG. 2C, a multiview image display apparatus 200 includes a depth adjustment unit 110, a rendering unit 120, a crosstalk compensation unit 120, a display unit 140, a controller 150, and a storage unit 160 (e.g., a memory, a storage, etc.). The configurations of the depth adjustment unit 110, the rendering unit 120, the crosstalk compensation unit 130, and the display unit 140 in FIG. 2C are the same as the configurations of the depth adjustment unit 110, the rendering unit 120, the crosstalk compensation unit 130, and the display unit 140 in FIG. 2A, and thus detailed description thereof will be omitted.

The storage unit 160 stores information for depth sections which provide the same 3D effect to the viewer, that is, just noticeable difference in depth (JNDD). For example, in response to a 8-bit depth having grayscale values of 0 (zero) to 255, the grayscale values of 0 (zero) to 255 may not be recognized as different 3D effects by the viewer, but grayscale values within a certain range may be recognized as the same depth. For example, the depth values within a range of 0 to 4 may provide the same 3D effect to the viewer, and the depth values within a range of 5 to 8 may provide the same 3D effect to the viewer. The information for the depth sections which provide the same 3D effect to the viewer may be acquired through experiments.

In response to the depth value of the region having the pixel value of less than the preset threshold value being adjusted according to the crosstalk estimation result as described above, the controller 150 may adjust the depth value to a depth value close to a focal plane in the depth section which provides the same 3D effect based on the JNDD information stored in the storage unit 160.

FIGS. 3A to 3D are views explaining a method of performing crosstalk inverse compensation according to an exemplary embodiment.

Figure 3A:
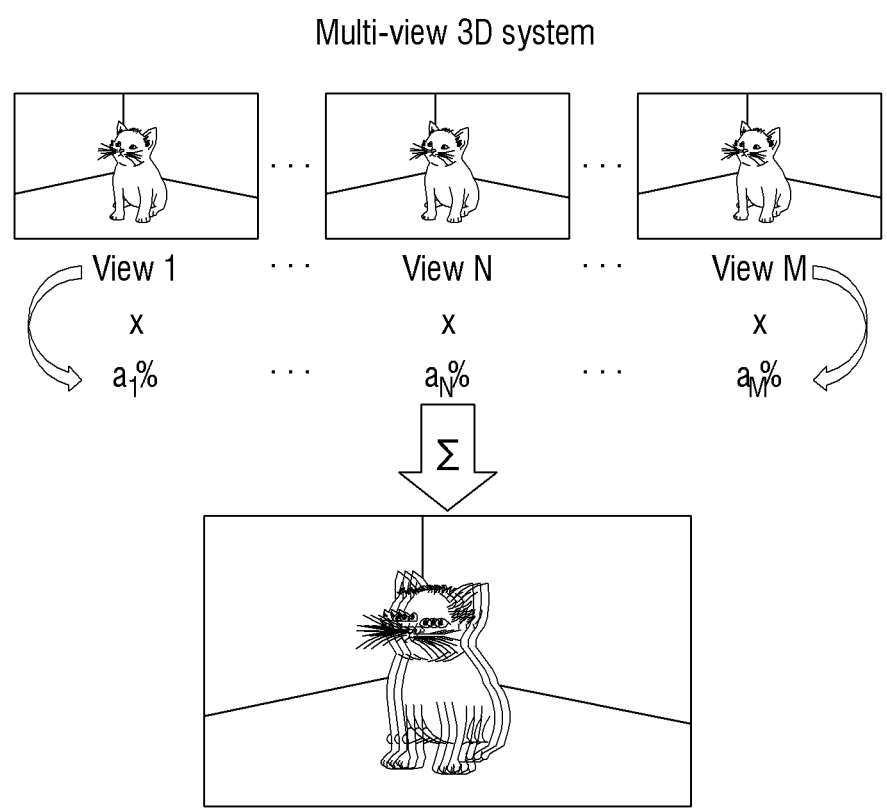

In general, as illustrated in FIG. 3A, crosstalk in the multiview 3D system may be generated from neighboring views as well as all views, and the degree of crosstalk generation may be implemented in a crosstalk matrix form.

For example, in response to being assumed that the crosstalk of neighboring views in four views is a %, and crosstalk of next neighboring views is b %, the crosstalk may be represented as illustrated in FIG. 3B.

Figure 3C:
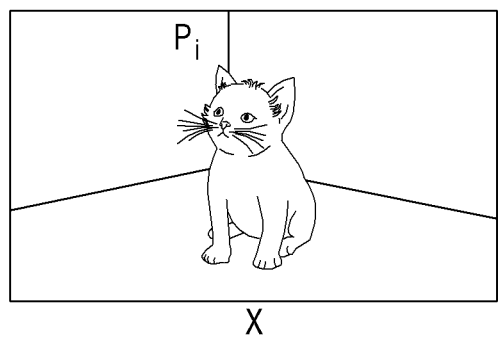
Figure 3C:
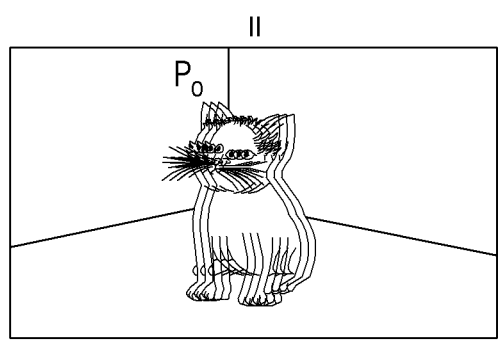

As illustrated in FIG. 3C, an output image may be affected by the crosstalk, and may be represented with the following Equation 1.

$$P_o = X \cdot P_i \quad \text{[Equation 1]}$$

Pi is an input image, Po is an output image, and X is a crosstalk matrix.

A new input may be calculated as the following Equation 2 so as to reduce the crosstalk effect.

$$P_i' = X^{-1} \cdot P_i \quad \text{[Equation 2]}$$

Then, a new output calculated as the following Equation 3 may be input to an original input.

$$P_o' = X \cdot X^{-1} \cdot P_i = P_i \quad \text{[Equation 3]}$$

Figure 3D:
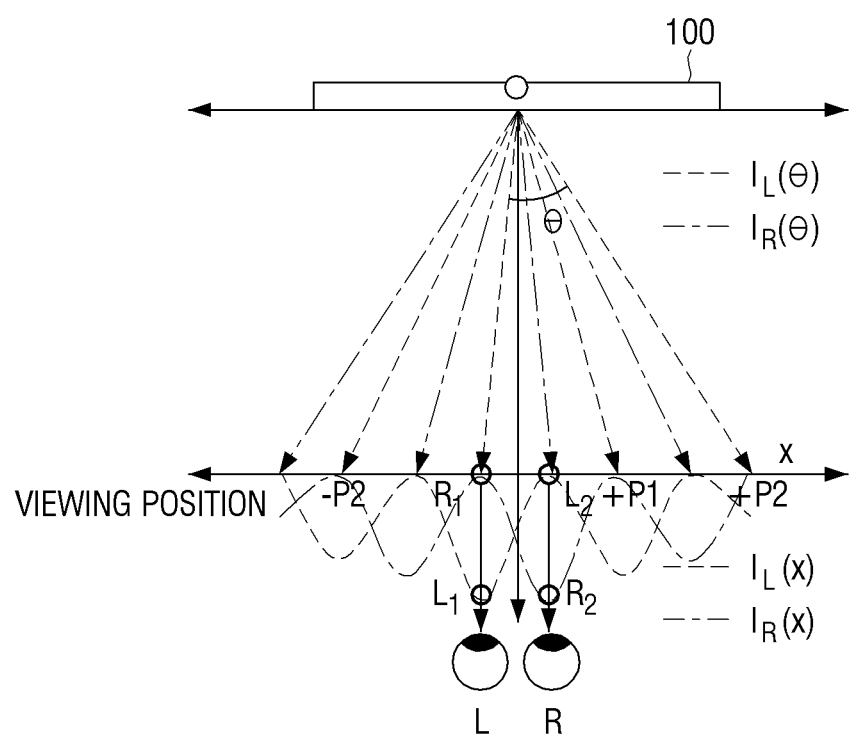

The crosstalk is generally measured as degree (ratio of luminance) in which luminance of a reference image to be elevated is affected by luminance of an image having a different viewpoint. For example, as the crosstalk calculation method, the international organization for standard (ISO) method and an in-circuit emulator (ICE) method may be used. FIG. 3D is a schematic view explaining the ISO method. Referring to FIG. 3D, the crosstalk is calculated based on the luminance measured by locating an optical instrument to a specific point of the autostereoscopic 3D display, for example, the origin O. For example, in response to left-eye crosstalk IL(θ) being measured, luminance of a left-eye image in the origin O is measured through the optical instrument in a state in which only the left-eye image is displayed in the display. At this time, the optical instrument measures luminance distribution of lights which form a certain angle θ with respect to the origin O and emitted to points +P1, +P2, 0, −P1, and −P2 as illustrated in FIG. 3D. Therefore, normal viewing luminance IL(θ) at each point is calculated. Then, luminance distribution of a right-image in the origin O is measured through the optical instrument in a state in which only the right-eye image is displayed in the display. Therefore, reverse viewing luminance IR(θ) at each point −P2, −P1, 0, +P1, and +P2 is calculated. Accordingly, the normal viewing luminance and the reverse viewing luminance are calculated, and the left-eye crosstalk in each point −P2, −P2, 0, +1, and +2 may be defined. The ICE method measures the crosstalk without considering of black luminance, and detailed description thereof will be omitted.

Figure 4B:
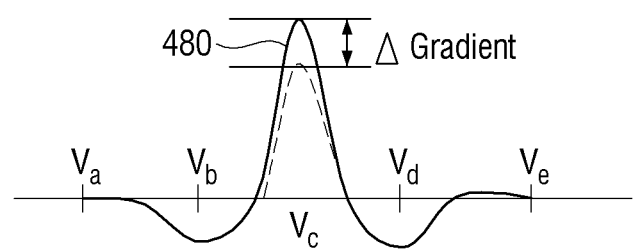
Figure 4C:
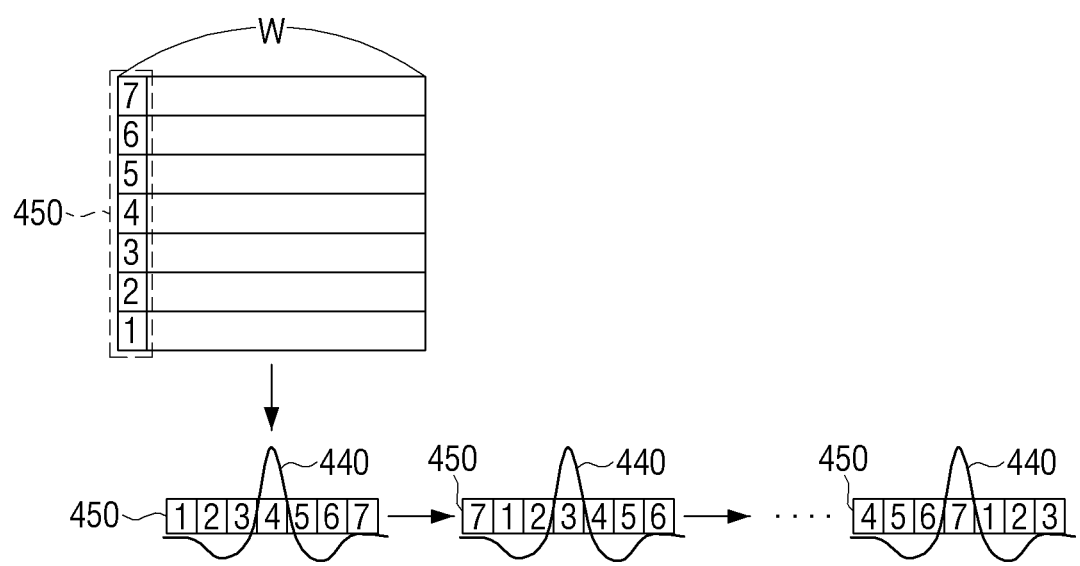

FIGS. 4A to 4C are views explaining a crosstalk inverse compensation method according to an exemplary embodiment.

As illustrated in FIG. 4A, it is assumed that rendering on 35 multiview images having a height h and a width w is performed.

Pixel lines of the 35 multiview images 411 to 414 may be combined and epipolar images corresponding to the pixel lines may be generated. Specifically, as illustrated in FIG. 4A, first pixel lines of the multiview images 411 to 414 may be combined and a first image 421 may be generated, and a-th pixel lines may be combined and a-th image 422 may be generated. Accordingly, h generated images corresponding to the pixel lines may be serially combined and epipolar images 430 may be generated.

At this time, a line having a preset form may be represented according to a depth size of an object in an image corresponding to each pixel line, that is, a depth size of a pixel region. For example, because a depth of an object A (●) is 0 (zero), the object A (●) is located in the same position in the 35 multiview images. Because an object B (Δ) has a depth of a certain size, the positions of the object B (Δ) are gradually changed in the 35 multiview images, and the position change is represented with a preset line form. Referring to FIG. 4A, a line corresponding to the object A (●) having the depth value of 0 (zero) is represented with a vertical line, and the object B (Δ) and an object C (X) having depths of certain values are represented with oblique lines.

FIG. 4B is a view illustrating a crosstalk inverse filter according to an exemplary embodiment.

As illustrated in FIG. 4B, the crosstalk inverse filter has a form in which an inverse matrix of the crosstalk matrix illustrated in FIG. 3B is implemented with a filter. In some cases, an appropriate Δ gradient 480 may be applied to the crosstalk inverse filter.

FIG. 4C is a view illustrating a method of applying a crosstalk inverse filter according to an exemplary embodiment.

For clarity, it is assumed and described that an epipolar image is configured of 7 multiview images.

As illustrated in FIG. 4C, the crosstalk inverse compensation may be performed by applying a crosstalk inverse filter on the basis of a single-viewpoint image in a pixel column 450 of an epipolar image configured of the same pixel lines, that is, first pixel lines of the 7 multiview images, and applying the crosstalk inverse filter 440 to the remaining images having other viewpoints through the same method as described above. The crosstalk inverse compensation may be performed by applying the crosstalk inverse filter on epipolar images configured of other pixel lines through the same method as described above.

Figure 5A:
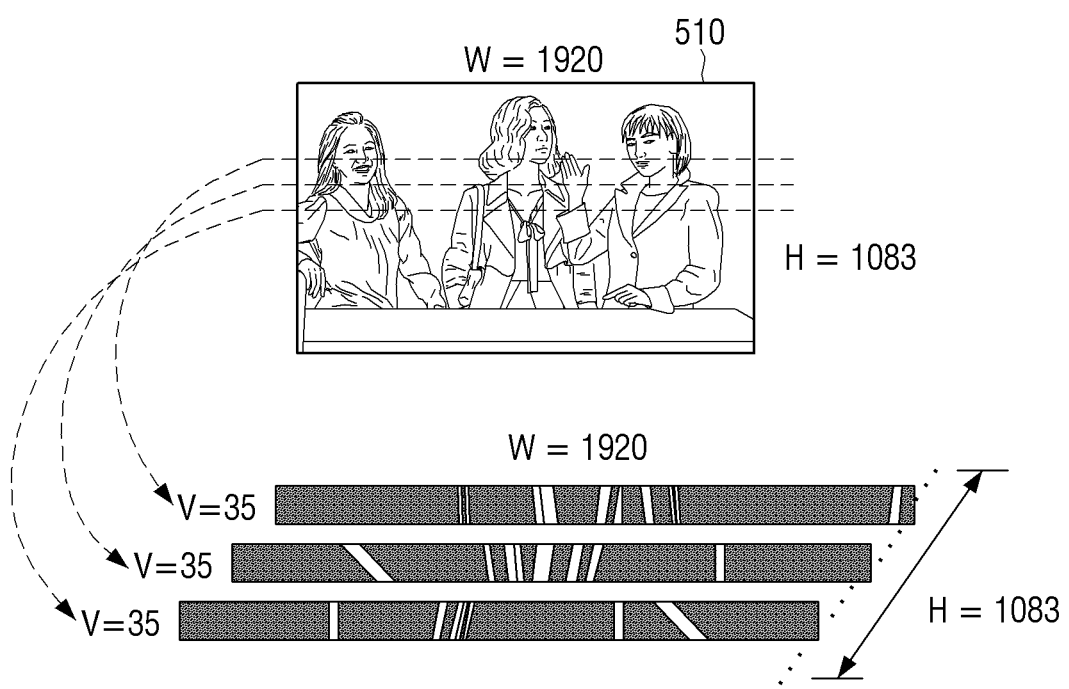
FIGS. 5A to 5C are views for explaining a crosstalk inverse compensation method according to an exemplary embodiment.
Figure 5B:
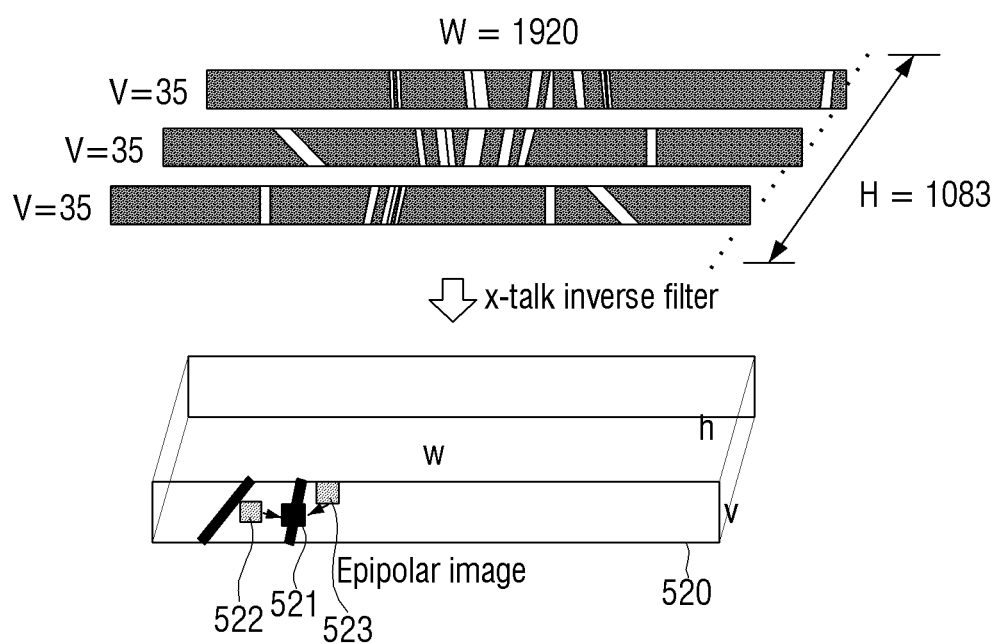
Figure 5C:
Figure 5C:
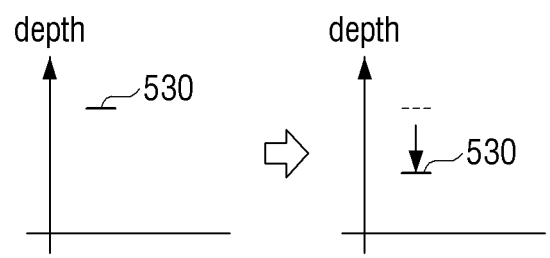

FIGS. 5A to 5C are views explaining a specific example of a crosstalk inverse compensation method according to an exemplary embodiment.

As illustrated in FIG. 5A, epipolar images may be generated by generating images configured of the same pixel lines of images 510 having a size of a width w(1920) and a height h(1083), and combining generated 1083 images.

Subsequently, crosstalk inverse compensation may be performed by applying the crosstalk inverse filter to the generated epipolar images through the method as illustrated in FIG. 4C.

Then, pixel value compensation on a pixel region having a negative pixel value according to the crosstalk inverse compensation may be performed.

Specifically, as illustrated in FIG. 5B, pixel value compensation may be performed on a pixel region 521 having a negative pixel value according to the crosstalk inverse compensation in a first epipolar image 520 configured of first pixel lines of a plurality of multiview images by replacing the pixel value of the pixel region 521 with pixel values of neighboring pixel regions 522 and 523. Pixel value compensation on other epipolar images configured of other pixel lines of the plurality of multiview images may be performed through the same method as described above.

However, the pixel value compensation method is merely exemplary. In another exemplary embodiment, the pixel value of the region having the negative pixel value is compensated with a pixel value of a pixel region corresponding thereto in a previous image on which the crosstalk inverse compensation is performed or a pixel value of a pixel region corresponding thereto in a corresponding input image before the crosstalk inverse compensation is performed.

As illustrated in FIG. 5C, a depth value of an input image 530 corresponding to the pixel region having the negative pixel value according to crosstalk inverse compensation in the first epipolar image 520 may be adjusted. Specifically, as illustrated in FIG. 5C, in response to the depth value of the input image 530 corresponding to the corresponding pixel region being equal to or larger than a preset threshold value, the corresponding depth value may be adjusted to be reduced. In response to the depth value of the input image 530 corresponding to the corresponding pixel region being less than the preset threshold value, the corresponding depth value may be adjusted to be increased.

Figure 6:
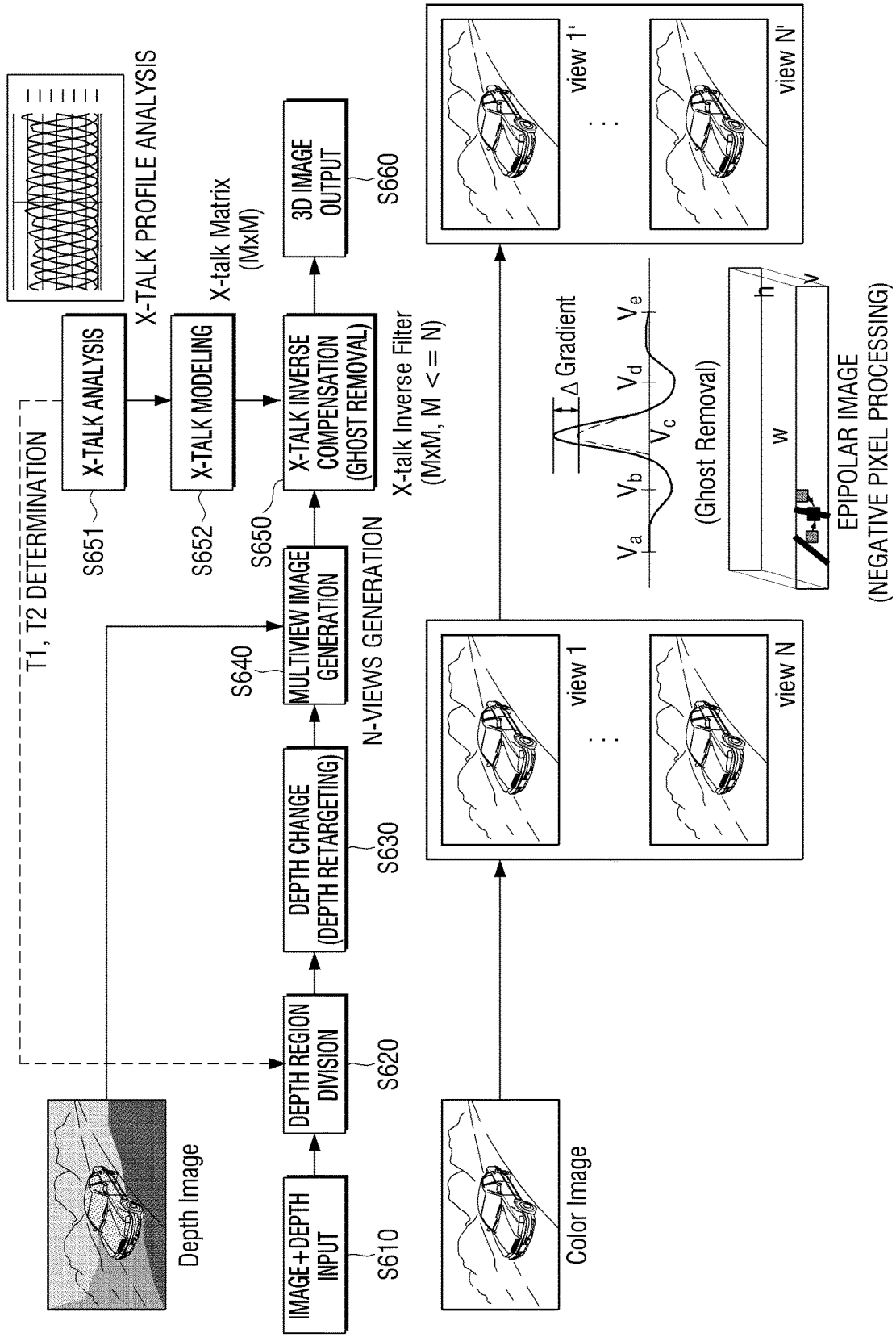
FIG. 6 is a schematic view schematically explaining an overall operation of a multiview image display apparatus according to an exemplary embodiment.

FIG. 6 is a schematic view schematically explaining an overall operation of a multiview image display apparatus according to an exemplary embodiment.

Referring to FIG. 6, in response to a color image and a depth image being input (operation S610), a depth region is divided (operation S620). A criterion for division of the depth region may be provided based on a crosstalk inverse compensation result.

Specifically, in operation S620, in response to an intensity difference between a specific pixel position x and a peripheral pixel position x' of an input 2D image, that is, Ix−Ix' being equal to or larger than a certain threshold value T1, and a depth of the pixel position x of the input depth image being equal to or larger than a certain threshold value T2, a region may be estimated as a region in which crosstalk is largely generated, and divided as a depth adjustment region.

In operation S630, a depth of the input image is adjusted, that is, retargeted based on information divided in operation S620. Specifically, depth adjustment on the region divided as the depth adjustment region may be performed. This is to increase view correlation with respect to the region in which the crosstalk is largely generated because reduction in the crosstalk is changed according to the view correlation of the multiview images.

The exemplary embodiment has described that the crosstalk generation region is estimated based on a characteristic of the input image, but it is merely exemplary. In another exemplary embodiment, after the crosstalk inverse compensation is performed in advance, the crosstalk generation region may be determined based on the crosstalk inverse compensation result.

Next, rendering on multiview images is performed based on the retargeted depth information (operation S640).

Then, crosstalk inverse compensation is performed based on the rendered multiview images (operation S650), and a 3D image is output using the multiview images on which the crosstalk inverse compensation is performed (operation S660). In operation S650 of performing crosstalk inverse compensation, the crosstalk is analyzed (operation S651), modeling on the crosstalk is performed, that is, a crosstalk matrix is generated (operation S652), and crosstalk inverse compensation may be performed using a crosstalk inverse filter generated based on the generated crosstalk matrix. Further, in operation S650 of performing crosstalk inverse compensation, pixel value compensation on a pixel region having a negative pixel value according to the crosstalk inverse compensation may be performed.

At this time, because the crosstalk inverse compensation is performed using the image of which a depth is adjusted based on the crosstalk inverse compensation result in advance, and the pixel value is corrected according to the crosstalk inverse compensation result, the sharper 3D image may be provided.

FIG. 7 is a flowchart illustrating a control method of a multiview image display apparatus according to an exemplary embodiment.

According to the control method of the multiview image display apparatus illustrated in FIG. 7, a depth of an input image is adjusted based on a crosstalk inverse compensation result (operation S710). Specifically, in operation S710, crosstalk is estimated, and a depth of a region which satisfies a preset condition may be adjusted as a preset depth value based on the crosstalk estimation result.

Subsequently, rendering on multiview images is performed based on the depth-adjusted image (operation S720).

Then, crosstalk inverse compensation is performed based on the rendered multiview images (operation S730).

The multiview images on which the crosstalk inverse compensation is performed are arranged in a preset arrangement pattern, and the multiview images arranged in the preset arrangement pattern are displayed (operation S740).

In operation S710 of adjusting the depth, in response to a difference between a pixel value of a specific region in the input image and a pixel value of a neighboring pixel region being equal to or larger than a preset threshold pixel value, and a depth value corresponding to the depth region being equal to or larger than a preset threshold depth value, the depth value corresponding to the specific region may be adjusted to the preset depth value.

The control method may further include performing crosstalk inverse compensation according to the crosstalk estimation result in advance. In operation S710 of adjusting the depth, a depth value of a region having a pixel value of less than a preset threshold value according to the crosstalk inverse compensation may be adjusted to the preset depth value. The region having the pixel value of less than the preset threshold value may be a region having a negative pixel value.

In operation S710 of adjusting the depth, in response to the depth value of the region having the pixel value of less than the preset threshold value being larger than the preset threshold depth value, the depth value may be adjusted to be reduced, and in response to the depth value being smaller than the preset threshold depth value, the depth value may be adjusted to be increased.

In operation S730 of performing crosstalk inverse compensation, an epipolar image corresponding to each of the pixel lines is generated by combining pixel lines of the rendered multiview images, and the crosstalk inverse compensation may be performed by applying a crosstalk inverse filter to the generated epipolar images.

Further, the control method may further include compensating a pixel value of a region having the pixel value of less than the preset threshold value according to the crosstalk inverse compensation in the epipolar image with a pixel value of a neighboring region.

The control method may further include compensating the pixel value of the region having the pixel value of less than the preset threshold value according to the crosstalk inverse compensation in the epipolar image with a pixel value of a region corresponding thereto in the input image.

The control method may further include compensating the pixel value of the region having the pixel value of less than the preset threshold value according to the crosstalk inverse compensation in the epipolar image with a pixel value on which the crosstalk inverse compensation is performed in a previous image of the input image.

On the other hand, the multiview image display apparatus may include a display panel in which a plurality of images having different viewpoints are serially repeatedly arranged, and a viewing area separation unit configured to provide optical views having different viewpoints. At this time, in operation S730 of performing crosstalk inverse compensation, crosstalk generated between the optical views having the different viewpoints may be compensated.

According to the above-described various exemplary embodiments, crosstalk inverse filtering through crosstalk modeling and depth retargeting may be combined and applied to the autostereoscopic display system, and thus a sharp 3D image may be serviced.

The multiview image display methods according to the above-described exemplary embodiments may be implemented in a program, and provided to the display apparatus.

As an example, a non-transitory computer-readable medium, in which a program for executing the operations of adjusting a depth of an input image, based on a crosstalk inverse compensation result, performing rendering on multiview images based on the depth-adjusted image, performing crosstalk inverse compensation based on rendered multiview images, and arranging the multiview images on which the crosstalk inverse compensation is performed in a preset arrangement pattern and displaying the multiview images arranged in the preset arrangement pattern is stored, may be provided.

The non-transitory computer-recordable medium is not a medium configured to temporarily store data such as a register, a cache, or a memory but an apparatus-readable medium configured to semi-permanently store data. Specifically, the above-described various applications or programs may be stored in the non-transitory apparatus-readable medium such as a compact disc (CD), a digital versatile disc (DVD), a hard disc, a Blu-ray disc, a universal serial bus (USB), a memory card, or a read only memory (ROM), and provided.

The foregoing exemplary embodiments and advantages are merely exemplary and are not to be construed as limiting the present inventive concept. The exemplary embodiments can be readily applied to other types of devices. The description of the exemplary embodiments is intended to be illustrative, and not to limit the scope of the claims, and many alternatives, modifications, and variations will be apparent to those skilled in the art.

What is claimed is:

1. A multiview image display apparatus comprising:
a crosstalk compensator;
a display; and
a controller configured to:
estimate crosstalk to thereby obtain an estimated crosstalk,
control the crosstalk compensator to perform the crosstalk inverse compensation according to the estimated crosstalk,
based on a difference, between a pixel value of the region of the input image and a pixel value of a neighboring region of the region, adjust a depth value of the region,
render multiview images based on the depth adjusted image, and
control the display to display the multiview images arranged in a predetermined arrangement pattern.

2. The multiview image display apparatus as claimed in claim 1, wherein the controller adjusts the depth value of the region based on the difference and the depth value of the region.

3. The multiview image display apparatus as claimed in claim 1, wherein the controller adjusts the depth value of the region to be reduced, in response to the depth value of the region being equal to or larger than a predetermined threshold depth value, and adjusts the depth value of the region to be increased, in response to the depth value of the region being less than the predetermined threshold depth value.

4. The multiview image display apparatus as claimed in claim 1, wherein the crosstalk compensator generates an epipolar image corresponding to each of pixel lines of the rendered multiview images by combining the pixel lines of the rendered multiview images, and performs crosstalk inverse compensation by applying a crosstalk inverse filter to the generated epipolar image.

5. The multiview image display apparatus as claimed in claim 4, wherein the controller controls the crosstalk compensator to compensate a pixel value of a region having the pixel value of less than a predetermined threshold value in the epipolar image according to the crosstalk inverse compensation with a pixel value of a neighboring region.

6. The multiview image display apparatus as claimed in claim 4, wherein the controller controls the crosstalk compensator to compensate the pixel value of the region having the pixel value of less than a predetermined threshold value in the epipolar image according to the crosstalk inverse compensation with a pixel value of a region of the input image corresponding to the region having the pixel value of less than the predetermined threshold value.

7. The multiview image display apparatus as claimed in claim 4, wherein the controller controls the crosstalk compensator to compensate the pixel value of the region having the pixel value of less than a predetermined threshold value in the epipolar image according to the crosstalk inverse compensation with a pixel value on which the crosstalk inverse compensation is performed in a previous image of the input image.

8. The multiview image display apparatus as claimed in claim 1, wherein the pixel value of the region is a negative pixel value.

9. The multiview image display apparatus as claimed in claim 1, wherein the display includes a display panel in which a plurality of images having different viewpoints are serially arranged, and a viewing area separator disposed in front of the display panel and configured to provide optical views having different viewpoints, and wherein the crosstalk compensator compensates crosstalk generated between the optical views having the different viewpoints.

10. A control method of a multiview image display apparatus, the method comprising:

estimating crosstalk and thereby obtaining an estimated crosstalk, performing the crosstalk inverse compensation according to the estimated crosstalk;

based on a difference between a pixel value of a region of an input image and a pixel value of a neighboring region of the region, adjusting a depth value of the region, rendering multiview images based on the depth value adjusted image, and displaying the multiview images arranged in a predetermined arrangement pattern.

11. The control method as claimed in claim 10, wherein the adjusting the depth value of the region comprises adjusting the depth value of the region based on the difference and the depth value of the region.

12. The control method as claimed in claim 10, wherein the adjusting of the depth comprises adjusting the depth value of the region to be reduced, in response to the depth value of the region being equal to or larger than a predetermined threshold depth value, and adjusting the depth value of the region to be increased, in response to the depth value of the region being less than the predetermined threshold depth value.

13. The control method as claimed in claim 10, wherein the performing of the crosstalk inverse compensation includes generating an epipolar image corresponding to each of pixel lines of the rendered multiview images by combining the pixel lines of the rendered multiview images, and performing crosstalk inverse compensation by applying a crosstalk inverse filter to the generated epipolar image.

14. The control method as claimed in claim 13, further comprising compensating the pixel value of the region, wherein the region has the pixel value of less than a predetermined threshold value in the epipolar image according to the crosstalk inverse compensation with the pixel value of the neighboring region.

15. The control method as claimed in claim 13, further comprising compensating the pixel value of the region having the pixel value of less than a predetermined threshold value in the epipolar image according to the crosstalk inverse compensation with a pixel value of a region of the input image corresponding to the region having the pixel value of less than the predetermined threshold value.

16. The control method as claimed in claim 13, further comprising compensating the pixel value of the region having the pixel value of less than a predetermined threshold value in the epipolar image according to the crosstalk inverse compensation with a pixel value on which the crosstalk inverse compensation is performed in a previous image of the input image.

17. The control method as claimed in claim 10, wherein the pixel value of the region is a negative pixel value.

* * * * *